(12) United States Patent
Merrill

(10) Patent No.: US 7,300,621 B2
(45) Date of Patent: Nov. 27, 2007

(54) METHOD OF MAKING A CERAMIC MATRIX COMPOSITE UTILIZING PARTIALLY STABILIZED FIBERS

(75) Inventor: Gary Brian Merrill, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 103 days.

(21) Appl. No.: 11/082,104

(22) Filed: Mar. 16, 2005

(65) Prior Publication Data

US 2006/0211564 A1 Sep. 21, 2006

(51) Int. Cl.
*C05B 35/80* (2006.01)

(52) U.S. Cl. ............... 264/640; 264/641; 501/95.1; 501/95.2

(58) Field of Classification Search ........... 264/640, 264/641; 501/95.1, 95.2; 428/293.4
See application file for complete search history.

(56) References Cited

U.S. PATENT DOCUMENTS

| | | | |
|---|---|---|---|
| 4,047,965 A * | 9/1977 | Karst et al. ............ 501/95.1 |
| 5,447,666 A * | 9/1995 | LaFontaine ............ 264/628 |
| 5,854,154 A | 12/1998 | Radford et al. |
| 5,990,025 A | 11/1999 | Suyama et al. |
| 6,013,592 A | 1/2000 | Merrill et al. |
| 6,030,563 A | 2/2000 | Strasser et al. |
| 6,132,542 A | 10/2000 | Cutler et al. |
| 6,136,237 A | 10/2000 | Straub et al. |
| 6,153,291 A | 11/2000 | Strasser |
| 6,197,424 B1 | 3/2001 | Morrison et al. |
| 6,217,997 B1 | 4/2001 | Suyama et al. |
| 6,235,379 B1 | 5/2001 | Kameda et al. |
| 6,287,511 B1 * | 9/2001 | Merrill et al. ............ 264/651 |
| 6,294,125 B1 | 9/2001 | Bridgewater et al. |
| 6,314,858 B1 | 11/2001 | Strasser et al. |
| 6,316,048 B1 | 11/2001 | Steibel et al. |
| 6,331,496 B2 | 12/2001 | Nakayasu |
| 6,363,902 B1 | 4/2002 | Strasser et al. |
| 6,397,603 B1 | 6/2002 | Edmondson et al. |
| 6,441,341 B1 | 8/2002 | Steibel et al. |
| 6,451,416 B1 | 9/2002 | Holowczak et al. |
| 6,537,617 B2 | 3/2003 | Nakamura et al. |
| 6,617,013 B2 | 9/2003 | Morrison et al. |
| 6,648,597 B1 | 11/2003 | Widrig et al. |
| 6,660,115 B2 | 12/2003 | Butler et al. |
| 6,670,026 B2 | 12/2003 | Steibel et al. |
| 6,676,783 B1 * | 1/2004 | Merrill et al. ............ 156/89.11 |
| 6,696,144 B2 | 2/2004 | Holowczak et al. |
| 6,709,230 B2 | 3/2004 | Morrison et al. |
| 6,723,382 B2 | 4/2004 | Yamaguchi et al. |
| 6,743,393 B1 | 6/2004 | Petrak |
| 6,746,755 B2 | 6/2004 | Morrison et al. |
| 6,758,653 B2 | 7/2004 | Morrison |
| 6,761,937 B2 | 7/2004 | Tului et al. |
| 6,767,659 B1 | 7/2004 | Campbell |

(Continued)

*Primary Examiner*—Steven P. Griffin
*Assistant Examiner*—Russell J Kemmerle

(57) ABSTRACT

A green body ceramic matrix composite material (30) is formed using ceramic fibers (32) in an intermediate state disposed in a green body ceramic matrix material (34). The fibers may be in either a dry but unfired (green) condition or in a partially fired condition. Selective control of the degree of pre-firing (pre-shrinkage) of the fibers may be used to control the level of residual stresses within the resulting refractory material resulting from differential shrinkage of the fibers and the matrix material during processing of the composite material.

9 Claims, 2 Drawing Sheets

U.S. PATENT DOCUMENTS

| | | |
|---|---|---|
| 6,830,724 B2 | 12/2004 | Kobashi et al. |
| 6,844,091 B2 | 1/2005 | Denham et al. |
| 6,969,546 B2 * | 11/2005 | DiChiara, Jr. .................. 428/49 |
| 6,977,060 B1 * | 12/2005 | Merrill et al. .................. 419/5 |
| 7,033,412 B2 * | 4/2006 | Kumar et al. .................. 55/523 |
| 7,179,524 B2 * | 2/2007 | Merrill et al. ............ 428/313.7 |
| 2004/0134172 A1 * | 7/2004 | Kumar et al. .................. 55/523 |
| 2005/0084665 A1 * | 4/2005 | DiChiara, Jr. ............ 428/293.4 |

* cited by examiner

METHOD OF MAKING A CERAMIC MATRIX COMPOSITE UTILIZING PARTIALLY STABILIZED FIBERS

FIELD OF THE INVENTION

This invention relates generally to the field of materials, and more particularly to the field of ceramic matrix composite materials.

BACKGROUND OF THE INVENTION

Ceramic materials generally have excellent hardness, heat resistance, abrasion resistance, and corrosion resistance, and are therefore desirable for high temperature applications such as in gas turbine engines and the like. However, ceramic materials are easily fractured by tensile stresses and exhibit a high degree of brittleness. To improve upon the fracture toughness of a ceramic material, it is known to provide a ceramic matrix composite (CMC) material wherein inorganic fibers are disposed in a matrix of ceramic material. The fibers provide tensile strength and toughness to augment the other desirable properties of the ceramic material. A CMC material may be formed by impregnating a preform of ceramic fiber-containing fabric material with a ceramic precursor material, such as by a known wet method such as slip casting or slurry infiltration, or by decomposing a chemical compound in the vapor form and depositing the resulting ceramic onto the fiber preform, or by using a sol-gel method or using a polymer pre-cursor material. The cast or laid-up part is then compacted and dried using low or high pressures and temperatures to form a green body. The term "green body" is used to denote a dried ceramic form or otherwise weakly bonded ceramic powder compact material prior to being fired, including such a material when used as a matrix material surrounding fibers in any state. The firing process drives off additional water and organic material and converts the green material to a denser, stronger more refractory ceramic material. Firing may be accomplished by known techniques such as atmospheric pressure sintering or reaction sintering which sinter the matrix to its final density to form the refractory ceramic matrix composite material.

One example of a commercially available oxide fiber/oxide matrix CMC material is an alumina-silica fiber/alumina matrix composite available from COI Ceramics, Inc. of San Diego, Calif. U.S. Pat. No. 4,047,965, incorporated by reference herein, describes a method of manufacturing such fibers that includes the steps of firing green fibers to remove water and organic material to form the final refractory fibers. It is known in the art to form CMC materials by surrounding fully fired (stabilized) ceramic fibers with a ceramic matrix material, and then drying and firing the composite at a temperature that is sufficiently high to sinter the matrix material without being high enough to damage the already-stabilized fibers.

BRIEF DESCRIPTION OF THE DRAWINGS

The invention is explained in following description in view of the drawings that show.

DETAILED DESCRIPTION OF THE INVENTION

Figure 1:
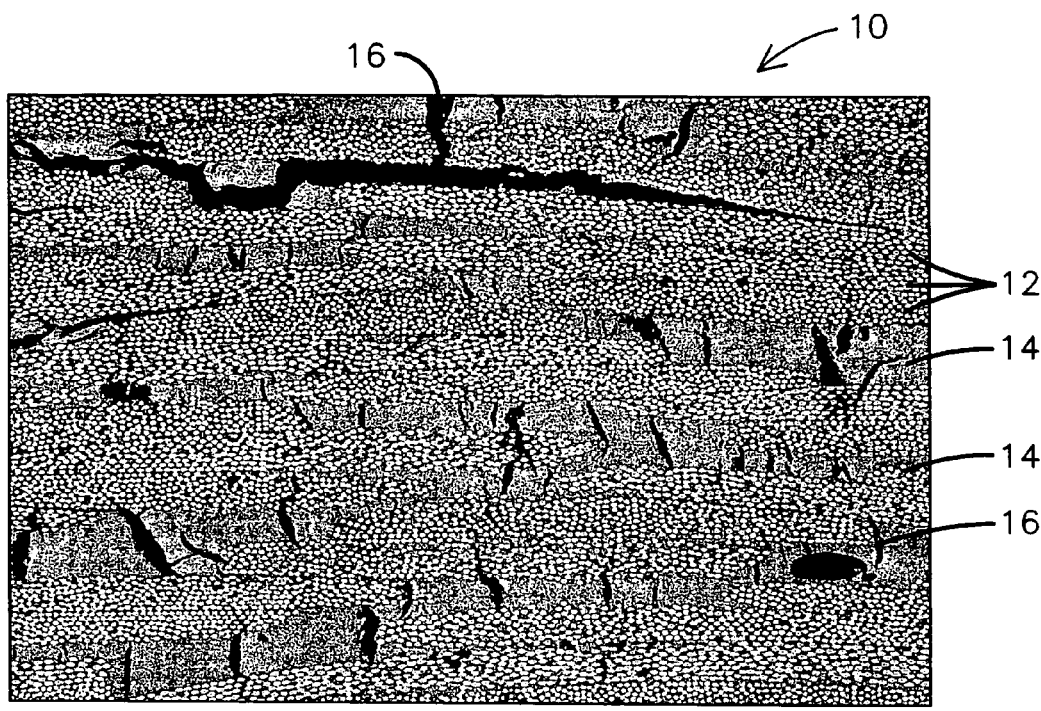
FIG. 1 is a photomicrograph of a fired oxide-oxide CMC material formed with fully stabilized fibers and exhibiting stress cracks in the matrix material as is known in the art.

FIG. 1 is a photomicrograph of a polished cross-section of a fully fired prior art alumina-silica fiber/alumina matrix composite material 10. The layers of fibers 12 are alternatively disposed within layers of the matrix material 14. Cracks 16 are visible within the matrix material 14. A large number of the cracks are generally oriented perpendicular to the longitudinal axis of the fibers 12, i.e. in the thru-thickness direction (top to bottom) as viewed in FIG. 1. The present inventor has observed that such cracks 16 typically do not have a constant width across their respective lengths, but rather are wider at about mid-length and taper to a smaller width toward the crack ends adjacent the adjoining fibers 12. The present inventor has recognized that this crack morphology infers that the matrix 14 is constrained from shrinking by the fibers 12. Thus, local residual stresses must exist between the matrix 14 and the fibers 12. The inventor has further recognized that this morphology is due to matrix shrinkage upon firing that is greater than the remaining fiber shrinkage. The matrix material of FIG. 1 is expected to exhibit approximately 10% linear shrinkage during processing whereas the fully stabilized fiber material of FIG. 1 may only shrink approximately 0.5% during the same processing. This is a ratio of 20:1 of matrix shrinkage to fiber shrinkage (total process shrinkage). While no empirical data has been gathered to assess the relationship between such local residual stresses and the overall strength of the CMC material 10, it is likely that these residual stresses result in a degraded material property. The impact of the residual stresses may be particularly significant with respect to matrix-dominated properties such as the strength between the adjacent fabric layers in a two-dimensional laminated structure, which can be referred to as the thru-thickness or flat-wise tensile strength.

Figure 2:
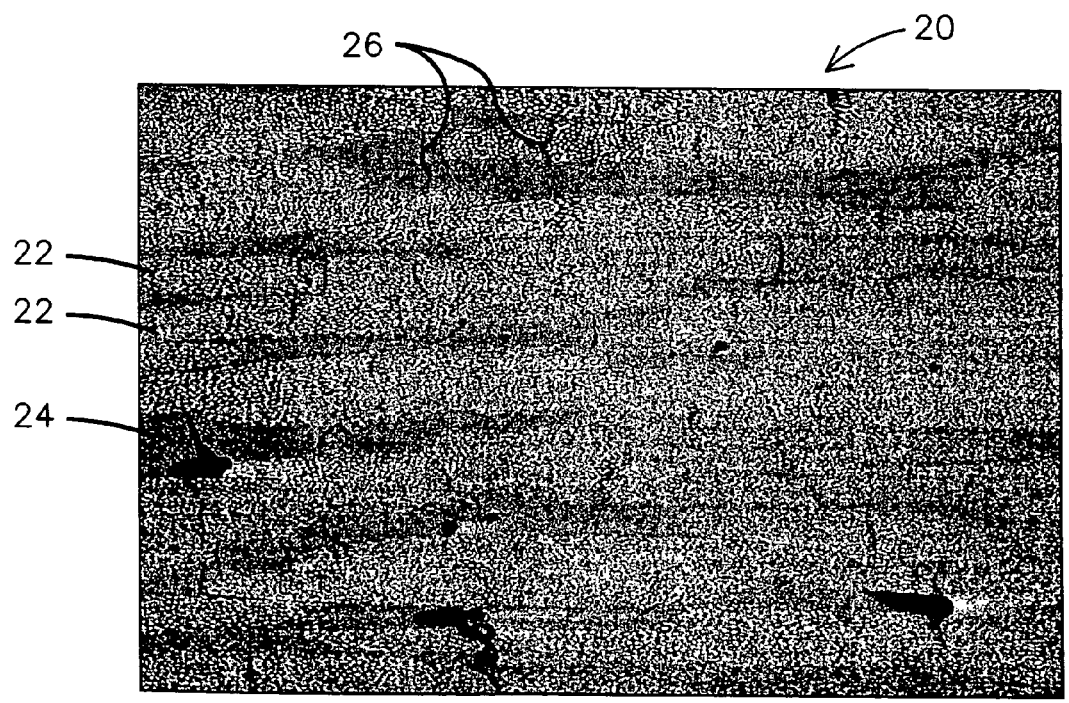
FIG. 2 is a photomicrograph of a fired oxide-oxide CMC material formed with partially fired fibers and exhibiting improved crack morphology in the matrix material.

FIG. 2 is a photomicrograph of a polished cross-section of a fully fired composite material 20 in accordance with one embodiment of the present invention. FIG. 2 is illustrated at the same magnification as FIG. 1 for purposes of illustration and comparison. Fibers 22 are alternatively disposed within layers of the matrix material 24. The matrix material 24 in this embodiment is alumina, the same as the matrix material 14 of FIG. 1. The fibers 22, in contrast, are made from an aluminosilicate composition consisting of approximately 70% Alumina and 28% Silica with 2% Boron (sold under the name NEXTEL 312). This fiber material was only partially stabilized and exhibited approximately 5% linear shrinkage when fired as part of the composite 20, significantly more than the fully stabilized fibers 12 used during the fabrication of prior art material 10. The composite material 20 of FIG. 2 thus exhibited a ratio of matrix shrinkage to fiber shrinkage of 2:1. Similar to prior art material 10 of FIG. 1, there are cracks 26 visible within the matrix material 24. The cracks 26 are generally oriented perpendicular to the longitudinal axis of the fibers 22. Notice, however, that there are fewer cracks per unit volume than in the prior art material 10, and that the cracks 26 appear to have a smaller average individual volume and crack width, and that the cracks 26 have a generally constant width along their respective lengths. These differences in crack morphology are attributed to the reduction in the ratio of matrix shrinkage to fiber shrinkage experienced during processing of the two different materials. The partially stabilized fibers 22 of improved material 20 experienced a degree of shrinkage during the firing of the composite material 20 at the same time that the matrix material 24 was sintering and shrinking. Accordingly, a lower level of local residual stress was developed between the fibers 22 and the matrix material 24, as evidenced by the shape and number of the cracks 26. Because CMC material 20 has lower internal residual stresses than prior art CMC material 10, it is expected to have improved properties when compared to the prior art material 10; in particular, improved matrix dominated properties. Furthermore, while prior art CMC material 10 will exhibit anisotropic shrinkage during firing due to the relatively unchanging axial length of the fibers 12 and shrinkage of the matrix material 14 in the thru-thickness direction, the innovative composite material 20 may exhibit isotropic shrinkage during firing.

Prior art patent U.S. Pat. No. 4,047,965 teaches that alumina-silica fibers are known to exhibit linear shrinkage of about 25 percent or more during firing, and that it is desirable to preshrink the fibers prior to their use to avoid any undesirable consequence of this shrinkage. Alumina matrix material is believed to exhibit about 10% shrinkage during a combined drying and firing process. The present inventor has innovatively recognized that the common practice of fully stabilizing fibers prior to their use in forming a CMC material has the unanticipated adverse consequence of generating residual stresses within the final composite material. A method in accordance with the present invention includes using unfired or partially fired ceramic fibers to form a CMC material. Fibers in their green or partially fired state are dry to the touch and do not adhere or stick to one another, and they have sufficient strength to be handled. The green or partially fired fibers may be oriented in any known form, such as strands, mats, 2D or 3D weaves, etc. The fibers can be laid up or preformed in any desired manner, and a matrix material then deposited on and between the fibers and dried by any process known in the art. The green body composite material is then fired to form a refractory CMC material 20.

The degree of pre-firing (pre-shrinkage) may be selected to allow a desired degree of shrinkage to occur during the final firing of the composite material 20. In one embodiment the amount of pre-firing is selected so that the fiber shrinkage during final firing of the green-body composite material will correspond to the expected shrinkage of the matrix material 24 in order to mitigate residual stresses there between in the refractory material 20. The degree of pre-shrinkage may be selected to balance the need for strength in the material (processability) and the remaining amount of shrinkage that can be achieved during final firing to match or approximate the matrix shrinkage characteristics.

Figure 3:
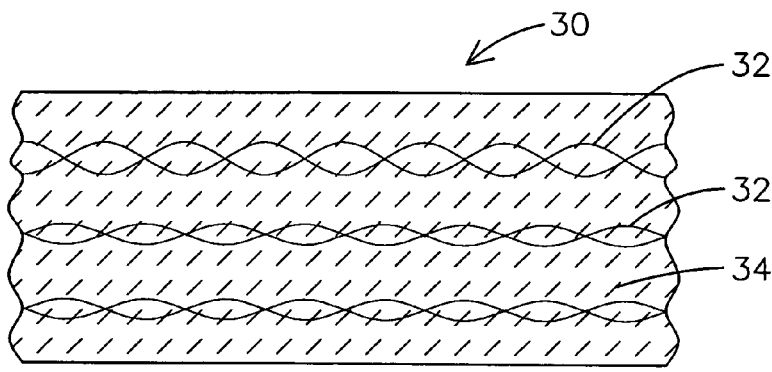
FIG. 3 is a partial cross-sectional view of a composite green body material.

FIG. 3 is a partial cross-sectional representation of a part 28 being manufactured for use in a gas turbine engine. The part 28 is formed of a green body ceramic matrix composite material 30 including a plurality of ceramic fibers 32 disposed in ceramic matrix material 34 in a green body state. The material 30 has a two-dimensional (2D) laminate geometry that may be laid up in a geometrically constrained shape to form the desired structure. The fibers 32 are laid up in an intermediate state. The term "intermediate state" is used herein to include both a dried but unfired condition (i.e. a green state) and a partially fired condition but not fully transformed into a final densified state. The degree to which the fibers 32 are pre-fired prior to being incorporated into the composite may vary depending upon the specific materials selected for a particular application and upon the relative amount of shrinkage that is expected for each of the selected materials. In the green body state of FIG. 3, no cracks would be expected in the composite material 30. Proper selection of the amount of pre-firing of the fibers 32 prior to their being surrounded by the matrix material 34 will result in a minimization of the stresses that will develop between the fibers 32 and the matrix material 34 during a subsequent final firing of the CMC material 30 and a reduction of the quantity and size of cracks that would develop in the matrix material 30 when compared to a prior art material 10. The green body ceramic matrix composite material 30 may exhibit isotropic shrinkage upon firing. In various embodiments, the fibers 32 may be partially pre-shrunk to achieve a ratio of total matrix shrinkage to fiber shrinkage of less that 5:1, or less that 3:1, or less than 2:1, or approximately 1:1.

Figure 4:
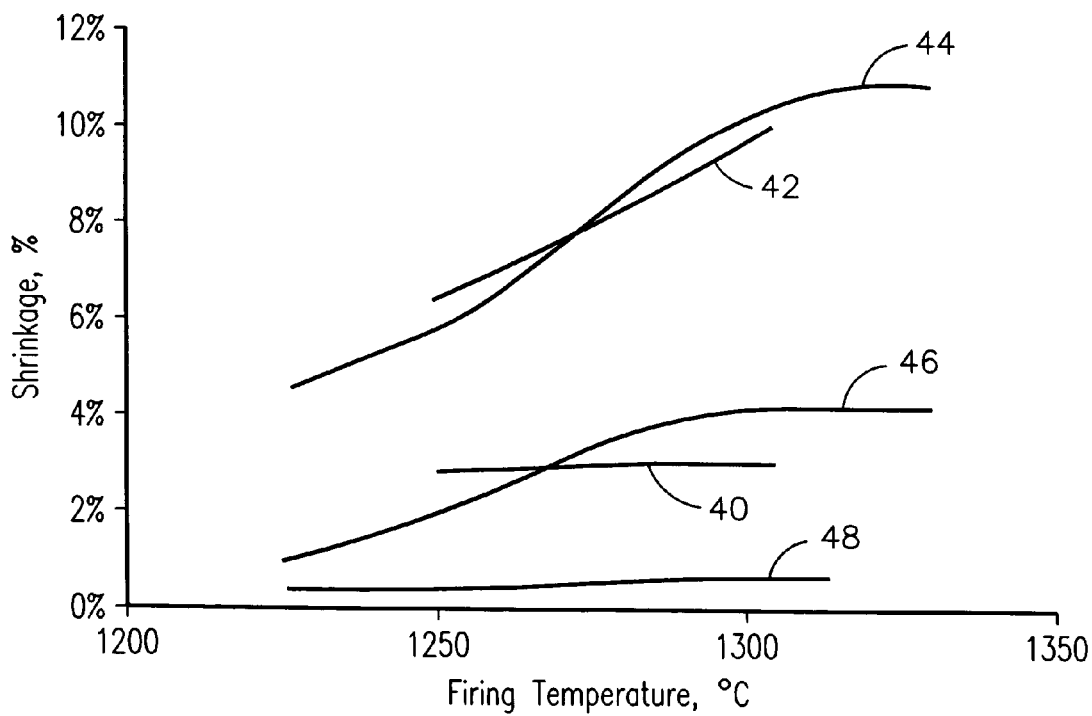
FIG. 4 is a representative graph of expected shrinkage of matrix and fiber materials.

FIG. 4 illustrates how a single type of fiber may be advantageously partially pre-shrunk for use with more than one type of matrix material. Line 40 represents the amount of shrinkage that may be expected at various processing temperatures for a first matrix material, and line 42 represents the amount of shrinkage that may be expected at various processing temperatures for a second matrix material. Line 44 represents the amount of shrinkage that may be expected at various processing temperatures for a fiber material that has undergone a pre-firing at a first (lower) temperature. That same fiber material, however, will exhibit a lesser amount of shrinkage at those same temperatures after it has undergone a pre-firing at a second (higher) temperature, as indicated by line 46. Furthermore, the same material may experience an even lower amount of shrinkage after it has been fully stabilized, as indicated by line 48. Thus, a single type of fiber may be selectively and partially pre-shrunk (partially pre-stabilized) to achieve approximately the same degree of matrix shrinkage expected during processing with any one of several matrix materials selected for use in a ceramic matrix composite material.

The present invention may be applied to any reinforced ceramic matrix composite material, and may advantageously be applied to CMC materials used in high temperature environments such as gas turbine engines. While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of making a ceramic matrix composite refractory material, the method comprising:
   partially processing ceramic fibers to only pre-shrink the fibers;
   surrounding the partially pre-shrunk ceramic fibers with a ceramic matrix material in a green body state to form a green body ceramic matrix composite material; and
   firing the green body ceramic matrix composite material to form a refractory material;
   wherein the amount of pre-shrinkage of the fibers is selected in response to an expected degree of shrinkage of the ceramic matrix material during the firing step.

2. The method of claim 1, further comprising partially pre-shrinking the fibers prior to the step of surrounding to a degree necessary to achieve a ratio of matrix shrinkage to fiber shrinkage during the steps of surrounding and firing of less than 5:1.

3. The method of claim 1, further comprising partially pre-shrinking the fibers prior to the step of surrounding to a degree necessary to achieve a ratio of matrix shrinkage to fiber shrinkage during the steps of surrounding and firing of less than 3:1.

4. The method of claim 1, further comprising partially pre-shrinking the fibers prior to the step of surrounding to a degree necessary to achieve a ratio of matrix shrinkage to fiber shrinkage during the steps of surrounding and firing of less than 2:1.

5. The method of claim 1, further comprising partially pre-shrinking the fibers prior to the step of surrounding to a degree necessary to achieve a ratio of matrix shrinkage to fiber shrinkage during the steps of surrounding and firing of approximately 1:1.

6. The method of claim 1, further comprising selecting the fibers to comprise alumina-silica.

7. The method of claim 1, further comprising selecting the matrix material to comprise alumina.

8. A method of making a ceramic matrix composite refractory material, the method comprising:
   selecting a type of ceramic fiber for use in a ceramic matrix composite material;
   determining an expected amount of shrinkage of the selected type of fiber during processing at elevated temperatures;
   selecting a type of ceramic matrix material;
   determining an expected amount of shrinkage of the matrix material during processing at elevated temperatures;
   partially pre-shrinking the ceramic fiber by a predetermined amount prior to surrounding the fiber with the matrix material to ton a ceramic matrix composite material; and
   firing the ceramic matrix composite material at an elevated temperature;
   wherein an amount of the pre-shrinkage of the fiber is controlled to be responsive to the expected amount of shrinkage of the selected matrix material so that shrinkage of the ceramic matrix composite material during firing is isotropic.

9. A method of making a ceramic matrix composite refractory material, the method comprising:
   selecting a type of ceramic fiber for use in a ceramic matrix composite material;
   determining an expected amount of shrinkage of the selected type of fiber during processing at elevated temperatures;
   selecting a first and a second type of ceramic matrix material;
   determining respective expected amounts of shrinkage of the first and the second types of matrix material during processing at elevated temperatures; and
   partially pre-shrinking the ceramic fiber by a predetermined amount prior to surrounding The fiber with a selected one of the first and the second types of matrix material to form a ceramic matrix composite material; and
   processing the ceramic matrix composite material at an elevated temperature;
   wherein an amount of the pre-shrinkage of the fiber is controlled to be responsive to the type of selected matrix material so that shrinkage of the fiber will correspond to shrinkage of the matrix material during the processing of the ceramic matrix composite material.

* * * * *